Figure 1:
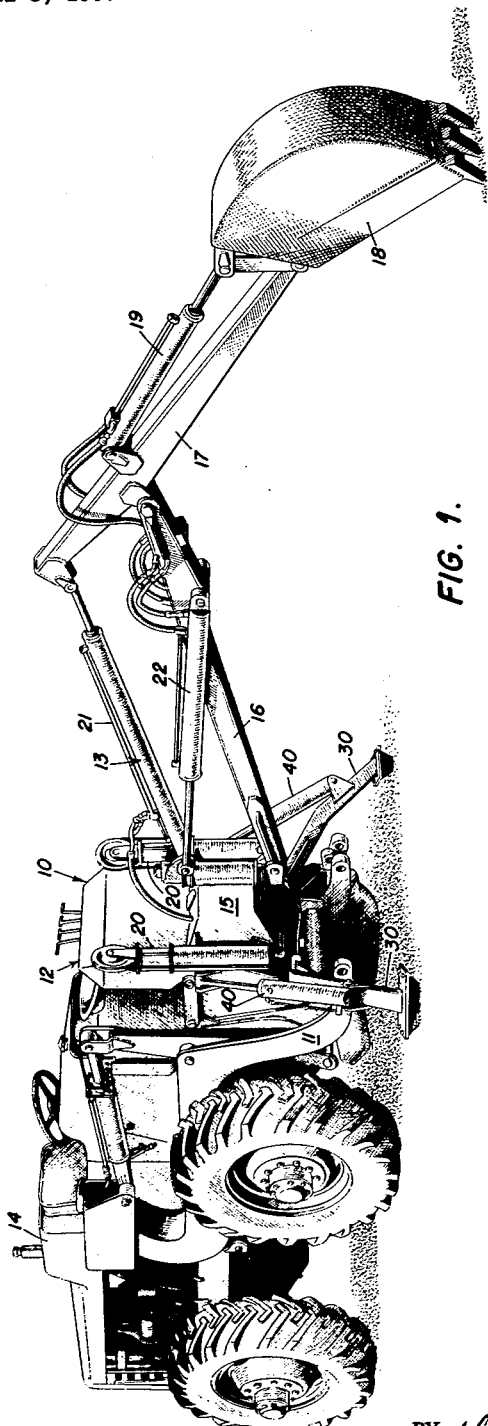

Oct. 10, 1961  V. J. HOLOPAINEN  3,003,651
EXCAVATING APPARATUS
Filed April 8, 1957  2 Sheets-Sheet 1

VAINO J. HOLOPAINEN
INVENTOR

BY *Norman S. Blodgett*
ATTORNEY

Oct. 10, 1961 V. J. HOLOPAINEN 3,003,651
EXCAVATING APPARATUS
Filed April 8, 1957 2 Sheets-Sheet 2

VAINO J. HOLOPAINEN
INVENTOR

BY Norman S. Blodgett
ATTORNEY

3,003,651
EXCAVATING APPARATUS
Vaino J. Holopainen, Rutland, Mass., assignor to Wain-Roy Corporation, Hubbardston, Mass., a corporation of Massachusetts
Filed Apr. 8, 1957, Ser. No. 651,392
4 Claims. (Cl. 214—138)

This invention relates to excavating apparatus and more particularly to equipment associated with a hydraulic digging attachment for a tractor.

It has been expedient in the past to use in excavating operations and the like a tractor having a loader at the front end and a hydraulic digging attachment at the other end. The front-end loader generally consists of a broad bucket attached to the tractor by means of links and movable for tilting and raising under the action of hydraulic cylinders. The hydraulic digging attachment consists of a relatively narrow bucket held at the end of a boom and dipper stick system and having stablizing legs, all arranged in the manner shown and described in the patent to Holopainen No. 2,698,697. There are situations, however, where providing a tractor with both a front-end loader and a rear-end digging attachment is both unnecessary and impractical. For instance, where a contractor has a fleet of tractors, each having a front-end loader and where each tractor may occasionally have use for a digging attachment, it would be uneconomical to provide each tractor with its own permanently-attached digging attachment. These and other problems presented by the prior art have been obviated in a novel manner by the present invention.

It is therefore an outstanding object of the invention to provide an excavating apparatus which permits alternative use as a loader and as a digger.

Another object of this invention is the provision of excavating apparatus including a quickly disconnectable means for providing a tractor with a hydraulic digging attachment.

It is another object of the present invention to provide for a tractor a combination front-end loader and a readily-disconnectable hydraulic digging attachment.

A still further object of this invention is the provision of apparatus including a hydraulic digging attachment which may be quickly mounted on or dismounted from a vehicle with a minimum of difficulty and without the need for exterior apparatus.

It is another object of the instant invention to provide excavating means including a hydraulic digging apparatus adapted to be quickly mounted on a front-end loader which is attached to a tractor, the apparatus being capable of self-support when not so mounted.

A further object of the invention is the provision of an adapter permitting the mounting of a hydraulic digging attachment on a tractor front-end loader.

With these and other objects in view, as will be apparent to those skilled in the art, the invention resides in the combination of parts set forth in the specification and covered by the claims appended hereto.

Figure 2:
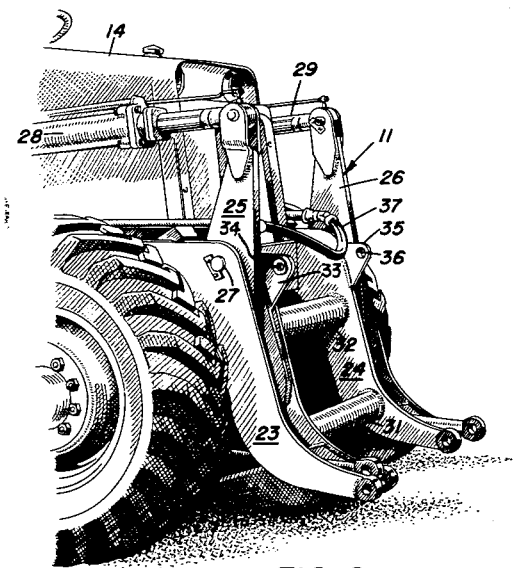
Figure 3:
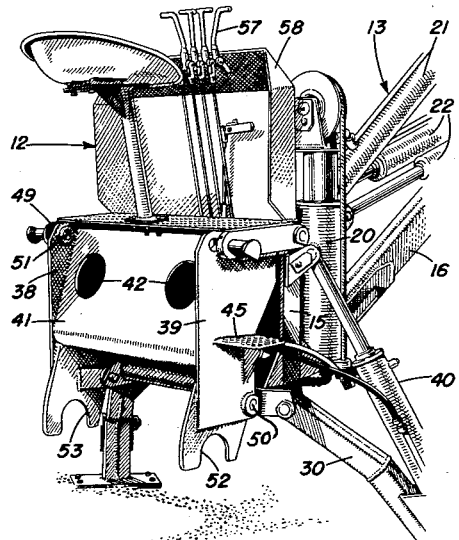
Figure 4:
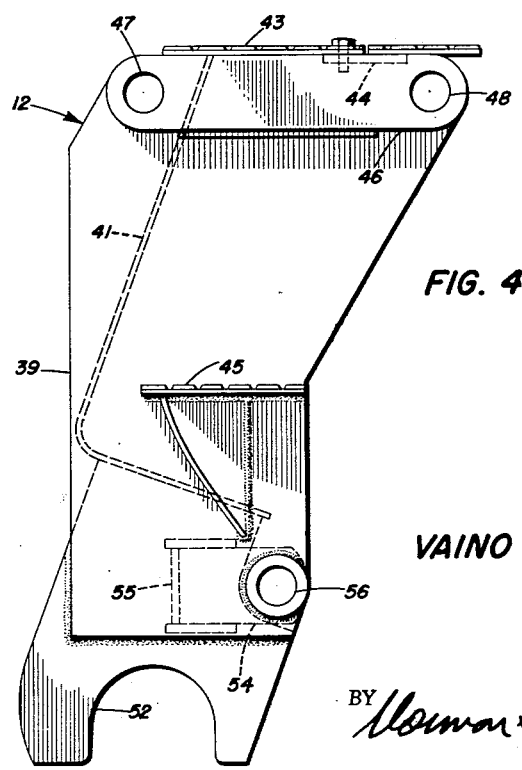

The character of the invention, however, may be best understood by reference to certain of its strucutral forms, as illustrated by the accompanying drawings in which:

FIGURE 1 is a perspective view of excavating apparatus embodying the principles of the present invention, FIGURE 2 is a perspective view of a tractor with a front-end loader, FIGURE 3 is a perspective view of a hydraulic digging attachment and adapter constructed according to the invention, and FIGURE 4 is a side view of a portion of the invention.

Referring first to FIGURE 1, wherein are best shown the general features of the invention, the excavating apparatus, indicated generally by the reference numeral 10, is shown as comprising a front-end loader 11, an adapter 12, and a hydraulic digging attachment 13. The apparatus is attached to one end of a tractor 14, which is shown as being of the four-wheel type. The digging attachment 13 is provided with a support member 15 adapted to be attached to the adapter 12 and to this member is pivotally connected one end of a boom 16; this connection is such that the boom may swing relative to the member about both vertical and horizontal axes. At the other end of the boom is connected a dipper stick 17 for swinging about a horizontal axis. To the lower end of the dipper stick is pivotally attached a bucket 18; a double-acting hydraulic cylinder 19 is connected between an intermediate portion of the dipper stick and an extension of the bucket spaced from the connection thereof to the dipper stick. A double-acting cylinder 21 joins the upper end of the dipper stick to the upper part of the support member; a pair of double-acting cylinders 22 joins the upper part of the support member to the intermediate portion of the boom 16. Vertically arranged single-acting cylinders 20 are mounted on the support member 15 and act through pulleys and cables to move the boom and associated equipment about a vertical axis. Stabilizers 30 are hingedly connected at one end to the support member and double-acting cylinders 40 join the intermediate portions of the stabilizers to the support member.

In FIGURE 2 it can be seen that the front-end loader 11 comprises a pair of arms 23 and 24 pivotally attached at their rearward ends to the tractor 14. At their forward ends, the arms are bifurcated and between the bifurcations lie secondary arms; a secondary arm 25 is so associated with the arm 23, while a similar secondary arm 26 is associated with the arm 24. The forward end of each of the arms 23, 24, 25 and 26 is provided with an aperture by which it is ordinarily attached to a wide loading bucket, not shown. The intermediate portion of the secondary arm 25 is pivotally connected to the arm 23 by a pivot pin 27, while the secondary arm 26 is similarly connected to the arm 24. To the upper end of the arm 25 is attached a hydraulic cylinder 28 and a similar cylinder 29 is connected to the arm 26. Generally speaking, the arms 23 and 24 are capable of vertical movement, while the secondary arms 25 and 26 serve to tilt the loading bucket. Extending between the arms 23 and 24 are horizontal tubular beams 31 and 32; these beams serve to maintain the arms in fixed, rigid relationship. Extending from the arm 23 at a portion thereof located above the beam 31 is an ear 33 having a bore or aperture 34; in a similar manner, an ear 35 having an aperture 36 extends forwardly from the arm 24. Usually, the beam 31 will be a standard element of a front-end loader, but the ears 33 and 35 will be added to the loader only when the present invention is practical. Oil supply conduits 37 extend from the tractor pressure-oil system, not shown.

The adapter 12 is shown in detail in FIGURES 3 and 4. Side members 38 and 39 are held in rigid, parallel relationship by a cross member 41 having oil line apertures 42; as is evident in FIGURE 4, the cross member is bent into a somewhat V-shaped configuration for strength. A floor plate 43 having its upper surface formed to prevent slipping extends across the upper edges of the side members and is bolted to a cross strap 44 which extends between the members and is welded to them. The side member 39 is provided with a step 45 extending outwardly thereof adjacent its forward edge. The floor plate extends outwardly of the members 38 and 39 on either side of the adapter. To the end of the plate which extends over the member 39 is welded a strap 46; the strap lies in spaced parallel relationship to the member 39. A bore 47 extends through the strap and the side member adjacent the rearward edge in the upper part thereof and a similar bore 48 extends through the forward end of the strap and the side member. A similar strap 49 having a bore 51 at its rearward end is associated with the side member 38; a bore, not shown, passes through the forward end of the strap and a corresponding part of the side member 38. The lower part of the side member 39 is provided with a downwardly-directed recess 52 having a generally semi-circular conformation. A similar recess 53 enters the lower edge of the side member 38. A short strap 54 is held in spaced parallel relationship to the inner surface of the side member 39 by means of a box-like welded supporting structure 55 and a bore 56 extends through the side member and strap. A similar strap and bore, not shown, are provided for the side member 38. A connecting pin 50 is provided for each of the above-described bores; it fits in its bore snugly and is provided at one end with a head and at the other end with a small transverse bore adapted to receive a cotter pin. The bores 48 and 56 and the corresponding bores associated with the side member 38 are located so as to permit aligning thereof with apertured ears, not shown, formed on the support member 15 of the hydraulic digging attachment 13. The ear associated with the bore 48 fits snugly between the strap 46 and the side member 39, while that associated with the bore 56 fits between the side member 39 and the strap 51. A similar arrangement of ears is provided on the support member 15 for engagement with the apertures formed in the forward edge of the side member 38 and with the corresponding straps. The hydraulic valving associated with the digging attachment is mounted within the support member and the control handles 57 connected thereto extend over the adapter. A dash board 58 is fastened to the support member and assists in the mounting of the control handles. A seat 59 is fastened to the floor plate 43 and extends upwardly therefrom.

The operation of the apparatus of the invention will now be readily understood in view of the above invention. Ordinarily, the adapter 12 and the hydraulic digging apparatus are maintained together as a unit and are connected or disconnected from the tractor and loader as occasion demands. The digging apparatus is capable of self support when the two stabilizers and the bucket contact the earth in the position shown in FIGURE 1. The oil must be locked in the cylinders 19, 21, 22 and 40 to provide this rigid, three-point support. In this condition, it is possible for the digging apparatus to support the adapter, as shown in FIGURE 3. The adapter and digging apparatus may be left this way for an indefinite period while the tractor and loader are being used for the excavating functions for which a front-end loader is particularly designed. When a digging operation is necessary, the loader bucket is removed, leaving the tractor and loader in the condition shown in FIGURE 2. The operator actuates the cylinders 28 and 29 to lower the arms 23 and 24 to the point where the beam 31 is well below the level of the lowermost parts of the adapter. The tractor is then maneuvered until the beam is directly under the recesses 52 and 53 and is aligned with them. The loader arms are then raised until the beam 31 lies within the recesses and contacts their uppermost peripheries. At that time, the ear 33 will lie between the strap 46 and the side member 39 with the aperture 34 aligned with the bore 47; in the same way, the ear 35 will reside between the strap 49 and the side member 38 with the aperture 36 aligned with the bore 51. The pins are inserted and the tractor, loader, adapter, and digging apparatus have then become a unitary digging machine. The stabilizers and bucket can be lifted out of contact with the earth to permit movement of the assembly from place to place. The hydraulic conduits 37 are passed through the apertures 42 of the cross member 41 and are connected to the valving of the digging apparatus to permit the actuation thereof.

It is evident that it is decidedly advantageous to be able to use a single tractor for either loading or digging without the necessity of providing one end with a loader and the other end with a digger. In an excavating operation wherein several tractors are engaged mainly in loading but wherein each tractor has occasion to require a digger once in a great while, the economy of needing to provide only one digging attachment for the fleet of tractors is obvious.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Excavating apparatus including an adapter having two parallel, spaced vertical, plate-like side members, a cross member joining the said side members in rigid relationship, each side member having a downwardly-directed, generally semi-circular recess formed in the lower portion thereof for engagement with a horizontal connecting beam of a tractor-attached loader, and a fastening aperture formed in the upper portion substantially vertically above the recess for connection to the loader, each side member also having two apertures arranged vertically above one another for the connection thereto of a digging attachment, and a strap associated with the portion of each side member adjacent each aperture and rigidly held in spaced, parallel relationship to the side member to form a pocket therewith, an aperture being formed in each strap in alignment with its corresponding aperture in the side member.

2. Excavating apparatus including an adapter having two parallel, spaced vertical plate-like side members, a cross member joining the said side members in rigid relationship, a floor plate extending over the upper edges of the side members, each side member having a downwardly-directed, semi-circular recess formed in the lower portion at one side thereof for engagement with a horizontal connecting beam of a tractor-attached loader, a seat attached to the floor plate, and a fastening aperture formed in the upper portion of each side member substantially vertically above the recess for connection to the loader, each side member having two apertures arranged vertically one above the other at the other side therefore for the connection thereto of a digging attachment.

3. Excavating apparatus having an adapter having two parallel, spaced vertical plate-like side members, a cross member joining the said side members in rigid relationship, a floor plate extending over the upper edges of the side members, each side member having a downwardly-directed, generally semi-circular recess formed in the lower portion at one side thereof for engagement with a horizontal connecting beam of a tractor-attached loader, a seat attached to the floor plate, and a fastening aperture formed in the upper portion of each side member substantially vertically above the recess for connection to the loader, each side member also having two apertures arranged vertically one above the other at the other side thereof for the connection thereto of a digging attachment, and a strap associated with the portion of each side member adjacent each aperture and rigidly held in spaced, parallel relationship to the side member to form a pocket therewith, an aperture being formed in each strap in alignment with its corresponding aperture in the side member.

4. Excavating apparatus including an adapter having two parallel, spaced vertical side members, a cross member joining the said side members in rigid relationship, a floor plate extending from one side member to the other, each side member having a downwardly-directed, semi-circular recess formed in the lower portion at one side thereof for engagement with a horizontal connecting beam of a tractor-attached loader, a seat attached to the floor plate, and a fastening aperture formed in the upper portion of each side member above the recess for connection to the loader, each side member having two apertures arranged vertically one above the other at the other side thereof for the connection thereto of a digging attachment.

References Cited in the file of this patent

UNITED STATES PATENTS

| | | |
|---|---|---|
| 2,595,864 | Lowry | May 6, 1952 |
| 2,710,569 | Altgelt | June 14, 1955 |
| 2,764,306 | Dorkins | Sept. 25, 1956 |
| 2,846,094 | Pilch | Aug. 5, 1958 |

FOREIGN PATENTS

| | | |
|---|---|---|
| 225,304 | Switzerland | Apr. 16, 1943 |